United States Patent
Lavrentovich et al.

(10) Patent No.: US 8,704,977 B2
(45) Date of Patent: Apr. 22, 2014

(54) HOMEOTROPIC AND HYBRID BULK ALIGNMENT OF LYOTROPIC CHROMONIC LIQUID CRYSTALS

(75) Inventors: Oleg D. Lavrentovich, Kent, OH (US); Yuriy A. Nastyshyn, Lviv (UA); Vassili G. Nazarenko, Kyiv (UA); Roman M. Vasyuta, Kyiv (UA); Oleksandr P. Boiko, Kyiv (UA); Ye Yin, Fremont, CA (US); Sergij V. Shiyanovskii, Stow, OH (US)

(73) Assignee: Kent State University, Kent, OH (US)

( * ) Notice: Subject to any disclaimer, the term of this patent is extended or adjusted under 35 U.S.C. 154(b) by 1551 days.

(21) Appl. No.: 12/042,638

(22) Filed: Mar. 5, 2008

(65) Prior Publication Data

US 2009/0226639 A1 Sep. 10, 2009

(51) Int. Cl.
*G01N 35/08* (2006.01)
*G02F 1/135* (2006.01)

(52) U.S. Cl.
USPC ............ 349/84; 349/96; 349/123; 349/128; 349/191; 349/199; 349/182; 422/82; 428/1.2; 428/1.26; 430/20

(58) Field of Classification Search
None
See application file for complete search history.

(56) References Cited

U.S. PATENT DOCUMENTS

| | | | |
|---|---|---|---|
| 5,596,434 A | 1/1997 | Walba et al. | |
| 6,411,354 B1 | 6/2002 | Lavrentovich et al. | |
| 6,486,338 B1* | 11/2002 | Hanelt et al. | 556/438 |
| 6,570,632 B2* | 5/2003 | Lavrentovich et al. | 349/84 |
| 6,673,398 B2* | 1/2004 | Schneider et al. | 428/1.2 |
| 2001/0029638 A1* | 10/2001 | Bobrov et al. | 8/506 |
| 2002/0168511 A1* | 11/2002 | Schneider et al. | 428/333 |
| 2002/0198358 A1* | 12/2002 | Park et al. | 528/353 |
| 2005/0106562 A1* | 5/2005 | Abbott et al. | 435/5 |

OTHER PUBLICATIONS

Tatiana Sergan, Tod Schneider, Jack Kelly and O. D. Lavrentovich, "Polarizing-alignment layers for twisted nematic cells," *Liquid Crystals*, 2000, vol. 27, No. 5, 567-572.
V. G. Nazarenko, A. K. St. Clair, R. Klouda, R. D. Polak, Yu. Nastishin and O. D. Lavrentovich, "Chemically Imidized Polyimide as an Alignment Material for LCDs," *SID 98 Digest*, May 1998, 135-138.
John Lydon, "Chromonic liquid crystal phases," *Current Opinion in Colloid & Interface Science* 1998, 3:458-466.
John Lydon, "Chromonics," *Handbook of Liquid Crystals*, vol. 2B: Low Molecular Weight Liquid Crystals II, 1998, 981-993; 998-1007.
Nazarenko et al., "Surface Alignment and Anchoring Transitions in Nematic Lyotropic Chromomic Liquid Crystsl", The American Physical Society, PRL 105, 017801 (2010); 0031-9007/10/105(1)/ 017801(4); pp. 017801-1-017801-4.

* cited by examiner

*Primary Examiner* — Gwendolyn Blackwell
*Assistant Examiner* — Anthony J Frost
(74) *Attorney, Agent, or Firm* — Fay Sharpe LLP

(57) ABSTRACT

The invention provides a liquid crystal cell and method thereof. The cell comprises two opposed substrates and a surfactant-free lyotropic chromonic liquid crystals (LCLC) material disposed therebetween. By using an ammonium compound with LCLC or surface treatment on the substrates, the alignment of the LCLC material can be manipulated as a homeotropic bulk alignment; or a hybrid bulk alignment in which the LCLC alignment is changed from homeotropic bulk alignment in the vicinity of one substrate to planar alignment in the vicinity of another substrate. The cell can be used in biosensing, detection and amplification of ligands, optical devices, and photovoltaics etc.

16 Claims, 8 Drawing Sheets

HOMEOTROPIC AND HYBRID BULK ALIGNMENT OF LYOTROPIC CHROMONIC LIQUID CRYSTALS

This invention was made with Government support under UKP1-2617-KV-04 awarded by Civilian Research and Development Foundation. The Government may have certain rights in this invention.

BACKGROUND OF THE INVENTION

The present invention relates to a liquid crystal cell and method thereof. More particularly, the liquid crystal cell contains a chromonic lyotropic liquid crystal that exhibits homeotropic or hybrid bulk alignment.

A liquid crystal is a state of matter in which molecules exhibit long-range orientational order and wherein long-range positional order is either reduced (two-dimensional positional order in columnar phases and one-dimensional positional order in smectic phases) or absent (nematic phases). Accordingly, liquid crystals fall between crystalline solids (which possess both positional and orientational order) and isotropic fluids (which exhibit no long-range order). Solid crystal or isotropic fluid can be transformed into a liquid crystal by changing temperature (creating a thermotropic liquid crystal) or by using an appropriate diluting solvent to change the concentration of mesomorphic molecules (creating a lyotropic liquid crystal).

Alignment of thermotropic liquid crystals is an active area of research and development. Usually, the alignment technique is based on a special unidirectional treatment of the plates or substrates that bind the liquid crystalline material. Such techniques are disclosed in U.S. Pat. No. 5,596,434 entitled "Self-Assembled Monolayers for Liquid Crystal Alignment." The '434 patent discloses that the plates are covered with a polymer (such as polyimide) layer which is mechanically rubbed. The direction of rubbing sets the direction of orientation of the thermotropic liquid crystal, i.e., the director, at the substrate, as a result of anisotropic molecular interactions at the interface. The phenomenon of orienting action between the anisotropic (rubbed, for example) substrate and the liquid crystalline alignment are called "anchoring." Alignment by surface anchoring is a standard means of alignment in thermotropic liquid crystalline displays. Surfaces are typically treated with a polymer or a surfactant in order to obtain the desired alignment effects. The methods of alignment are well established for thermotropic liquid crystals but are not necessarily applicable to lyotropic liquid crystals because of the differences in the molecular structure between the two classes of liquid crystals.

Lyotropic liquid crystals are more difficult to align than their thermotropic counterparts. The reason is that most lyotropic liquid crystals are based on amphiphilic materials (surfactants) dissolved in water or oil. Amphiphilic molecules have a polar (hydrophilic) head and a non-polar (hydrophobic) aliphatic tail. When surfactant molecules are in contact with a substrate, their amphiphilic nature generally results in a perpendicular orientation of the molecule with respect to the plane of the substrate. Either the polar head or the hydrophobic tail of the molecule is attracted to the bounding plate, which results in the perpendicular alignment of the molecule with respect to the substrate. Perpendicular alignment means that the preferred orientation is the so-called homeotropic alignment, in which the optical axis is perpendicular to binding plates.

An exemplary lyotropic liquid crystal cell is designated generally by the numeral 10 in FIG. 1. The cell 10 includes a pair of opposed substrates 12, which are sealed in a well-known manner, that contain surfactant-based lyotropic liquid crystal material designated generally by the numeral 14. The material 14 is formed using water 16 as a solvent for biphilic molecules 18. Each of the liquid crystal molecules 18 possesses polar (hydrophilic) parts 20 and apolar (hydrophobic) parts 22. When water 16 is added to biphilic molecules 18, such as the cationic surfactant cetylpiridinium chloride [$C_{21}H_{38}ClN$], a bilayer 26 forms as the hydrophobic regions coalesce to minimize interaction with the water 16 while enhancing the polar component's interaction with water. The concentration and geometry of the specific molecule define the supramolecular order of the liquid crystal. The molecules can aggregate into lamellae as well as disk-like or rod-like micelles, or, generally, aggregates of anisometric shape. Lyotropic liquid crystals are usually visualized as ordered phases formed by the rod-like surfactant molecules 18 (such as $C_{21}H_{38}ClN$ molecules) in water. These anisometric aggregates form a nematic, smectic, columnar phase, of either non-chiral or chiral (cholesteric phase) nature. For example, the $C_{21}H_{38}ClN$ molecules form a stack of lamellae of alternating layers of water and biphilic molecules, thus giving rise to a lamellar smectic A phase. The molecules on average are oriented along the direction schematically shown by a thick vertical arrow 28 called the director n. On average, the surfactant molecules are oriented along the director n. Surfactant molecules and thus the director n orient normally perpendicular to the bounding plates 12 (so-called homeotropic orientation).

There is a special class of lyotropic liquid crystals, called lyotropic chromonic liquid crystals (LCLC). The LCLC family embraces a range of dyes, drugs, nucleic acids, antibiotics, carcinogens, and anti-cancer agents. The molecular and macrostructure of LCLC's are markedly different from that of conventional lyotropic liquid crystals based on amphiphilic rod-like molecules with polar heads and hydrophobic alkyl chain tails, also referred to as surfactants. LCLC molecules are believed to be plank-like rather than rod-like, rigid rather than flexible, aromatic rather than aliphatic. The π-π interaction of the aromatic cores is the main mechanism of molecular face-to-face stacking according to Lydon [J. Lydon, Chromonics, in: Handbook of Liquid Crystals (Wiley-VCH, Weinheim, 1998) v. 2B, p. 981 and Current Opin. Col. Inter. Sci. 3, 458 (1998)]. Hydrophilic ionic groups at the periphery of the molecules make the material water-soluble. These materials have become a subject of intensive studies lately as it became clear that they can be used as internal polarizing elements in liquid crystal displays, see T Sergan et al., Liquid Crystals v. 5, pp. 567-572 (2000) and in the amplification and detection of ligands as disclosed in U.S. Pat. No. 6,171,802. These applications are enhanced by a uniform alignment of LCLC materials with the director in the plane (planar) of the cell (or slightly tilted).

It has been disclosed by Ichimura et al that inclusion of a non-ionic surfactant into an LCLC such as disodium chromoglycate results in a material that can be aligned by a photoirradiated polymer which incorporates azobenzene groups. But, inclusion of the surfactant material introduces undesirable impurities which can adversely affect the interaction between the liquid crystal and the ligands. Moreover, only photosensitive polymers are shown to orient the liquid crystal material without conclusive reasoning as to how this is achieved.

Reliable techniques for planar alignment of surfactant-free LCLC materials by means of surface anchoring are known and described in U.S. Pat. No. 6,411,354. To align the LCLC in a planar fashion a polymer alignment layer is disposed on the substrate and either rubbed or otherwise physically modified to impart a uniform orientation to the liquid crystal material. The alignment material is a polymer that yields a homeotropic (perpendicular) alignment of standard thermotropic liquid crystals. When the homeotropic polymer surface is rubbed slightly, the nematic phase of the Cromolyn LCLC aligns in the direction of rubbing. A similar surface rubbing gave a high pretilt angle for a typical thermotropic liquid crystal, 5CB. This fact demonstrates that one is able to align LCLCs with surface treatments that exhibit high pretilt angles for thermotropic liquid crystals. Other alignment techniques are also believed to be viable with LCLC material. For example, angular deposition of $SiO_x$ could be used as an alignment layer. Alternatively, irradiation of a photosensitive polymer with polarized light could be used. Of course, only photosensitive polymers can be used in this technique which may adversely alter the properties of the liquid crystal for its intended use in this application.

Advantageously, the present invention provides a new type of liquid crystal cell that contains a chromonic lyotropic liquid crystal exhibiting homeotropic or hybrid bulk alignment. The invention may be widely used in, for example, biosensing, detection and amplification of ligands, fabrications of optical elements such as optical retarders including compensators or highly effective optical compensating films or layers, and photovoltaics, among other applications.

BRIEF DESCRIPTION OF THE INVENTION

One aspect of the invention provides a liquid crystal cell comprising (i) a first substrate; (ii) a second substrate opposed to said first substrate; and (iii) a surfactant-free aligned lyotropic liquid crystal material disposed between said first substrate and said second substrate; wherein the alignment of said lyotropic liquid crystal material is a homeotropic alignment at least in the vicinity of said first substrate.

Another aspect of the invention provides a method of making the aforementioned liquid crystal cell comprising (i) providing a first substrate; (ii) providing a second substrate opposed to said first substrate; (iii) disposing a surfactant-free lyotropic liquid crystal material between said first substrate and said second substrate; and (iv) homeotropically aligning said lyotropic liquid crystal material at least in the vicinity of said first substrate.

Still another aspect of the invention provides the use of the aforementioned liquid crystal cell in biosensing; detection and amplification of ligands; fabrication of optical elements such as optical retarders and optical compensating films; and photovoltaics.

DETAILED DESCRIPTION OF THE INVENTION

Figure 1:
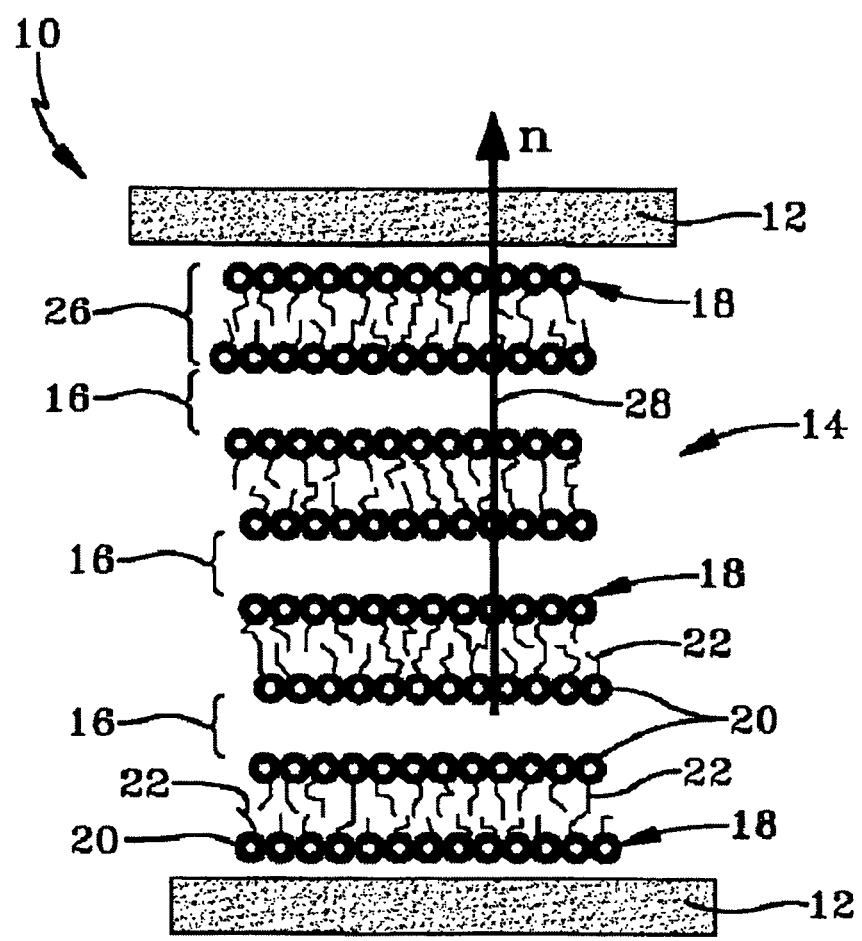
FIG. 1 is a schematic cross-sectional view of a lyotropic liquid crystal cell in prior art.
Figure 2:
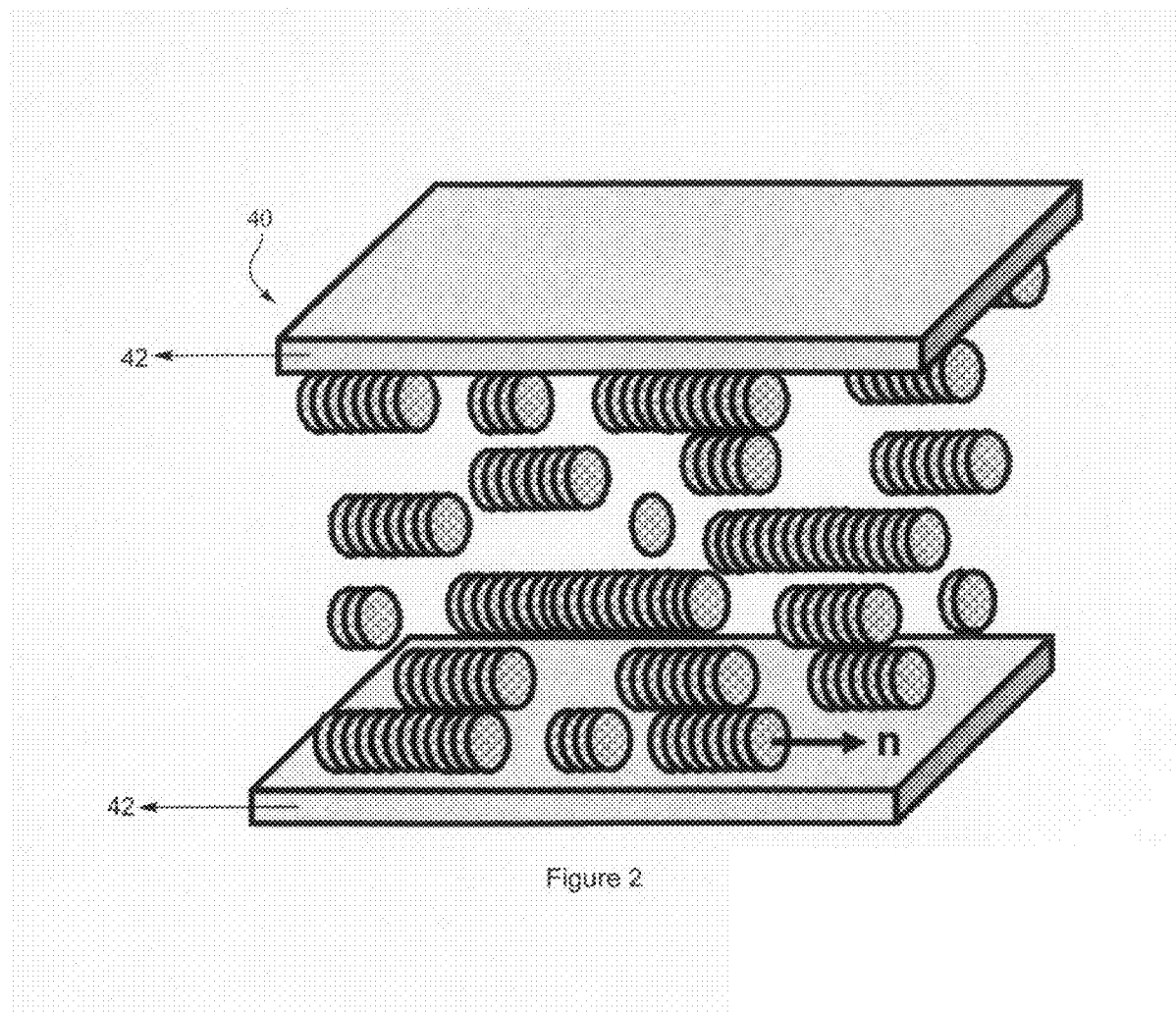
FIG. 2 is a schematic cross-sectional view of a lyotropic chromonic liquid crystal cell with bulk planar alignment.
Figure 3:
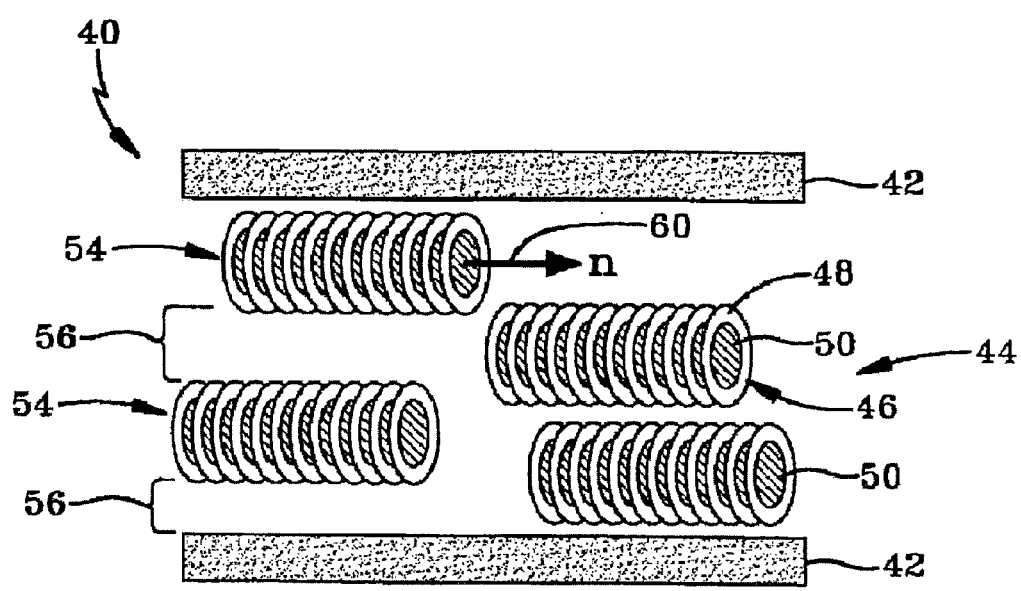
FIG. 3 is a schematic cross-sectional view of a lyotropic chromonic liquid crystal cell with bulk planar alignment.

FIGS. 2-4 and 6 illustrate lyotropic chromonic liquid crystal cells with bulk planar alignment, bulk homeotropic alignment, and hybrid alignment. With reference to FIGS. 2 and 3, two lyotropic chromic liquid crystal cells with bulk planar alignment are designated generally by the numeral 40. The cell 40 includes a pair of opposed substrates 42, which can be sealed in the manner known in the art. The cell 40 contains lyotropic liquid crystal material 44. The lyotropic chromonic liquid crystals (LCLCs) molecules, designated generally by the numeral 46, are disc-like or plank-like. The polar hydrophilic parts 48 form the periphery of each molecule, while the central core 50 is relatively hydrophobic. This distinction creates a range of different ordered structures. Individual disc-like molecules may form cylindrical aggregates 54 in water 56. The direction of average molecular orientation is defined by the orientation of the normals to the planes of the plank-like or disc-like molecule. In other words, a director 60 is along the axis of the cylindrical aggregate. It will be appreciated that other geometries of director orientation and of aggregates of chromonic molecules are possible, as discussed by Lydon. If the cylindrical aggregates shown do not arrange in a well-defined lattice with a long-range positional order, they still can form an ordered phase by aligning the long axes and forming a uniaxial nematic liquid crystalline phase. Chromonic materials may also form other liquid crystalline phases, such as lamellar, hexagonal, M-phase, or N-phase. At an appropriate range of concentration, aggregates form an orientationally-ordered phases. Director 60 shows the direction of orientation. In FIGS. 2 and 3, the long axes of the aggregates are oriented in a direction parallel to the bounding plates 42.

Liquid crystalline phases are characterized by orientational order of molecules or their aggregates. In the uniaxial liquid crystal phases such as nematic and smectic A, the average direction of orientation of the molecules or aggregates is described by a unit vector, called the director and often denoted as the letter "n". Generally, the two opposite directions of the director are equivalent, n=−n. In the uniaxial phases, the director is simultaneously the optical axis of the medium. An optically uniaxial liquid crystalline medium is birefringent. A uniaxial birefringent medium is characterized by two optical refractive indices: an ordinary refractive index "$n_o$" for an ordinary wave and an extraordinary refractive index "$n_e$" for an extraordinary wave.

Figure 4:
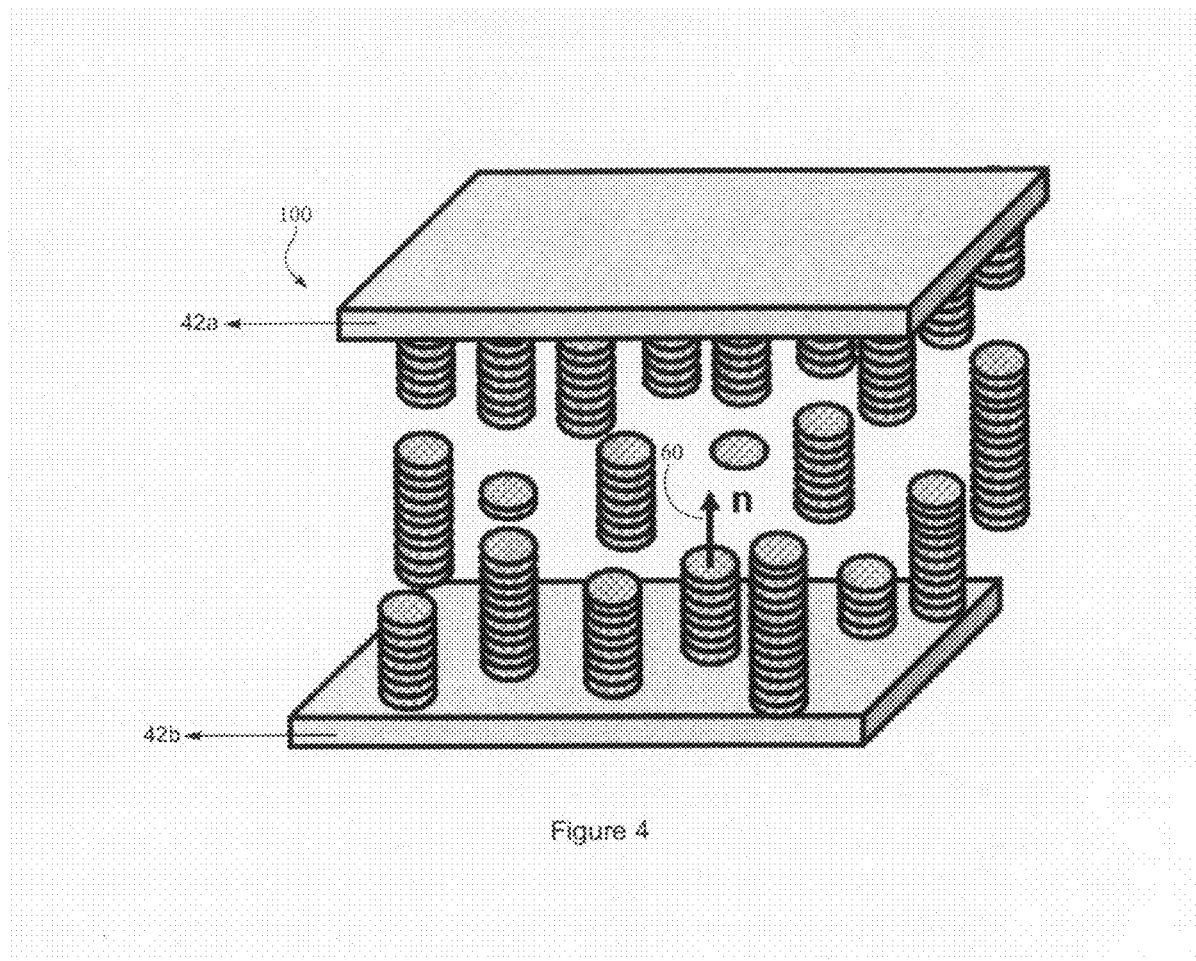
FIG. 4 is a schematic cross-sectional view of a lyotropic chromonic liquid crystal cell with bulk homeotropic alignment according to one embodiment of the present invention.

Various embodiments of the present invention provide a liquid crystal cell 100 as shown in FIG. 4. With reference to FIG. 4, cell 100 comprises (i) a first substrate 42a; (ii) a second substrate 42b opposed to first substrate 42a; and (iii) a surfactant-free lyotropic liquid crystal material disposed between first substrate 42a and second substrate 42b and aligned. FIG. 4 is similar to FIGS. 2 and 3 except that director 60 or the long axes of the aggregates are oriented in a direction perpendicular to substrate 42a and substrate 42b. In FIG. 4, the alignment of the lyotropic liquid crystal material is a bulk alignment, which is stable. The alignment is a homeotropic alignment in the vicinity of first substrate 42a, and the alignment is also a homeotropic alignment in the vicinity of second substrate 42b. The cell comprises a bulk solution in which the lyotropic liquid crystals are aligned homeotropically as a uniform liquid crystalline cell. LCLCs can be aligned in bulk as a uniform liquid crystalline monodomain within a closed cell.

The first substrate 42a may comprise suitable material such as glass. Similarly, the second substrate 42b may comprise suitable material such as glass. Typically, the lyotropic liquid crystal material in FIG. 4 is chromonic.

In some exemplary embodiments, the method for homeotropic bulk alignment of LCLCs is based on the incorporation of an ammonium compound in the LCLC. For example, the lyotropic liquid crystal material in cell 100 may comprise a combination of diammonium 6,11-dioxo-6,11,17,17a,21b,22-hexahydrobenzimidazo[2,1a]benzimidazo [1'',2'':2',3'] isoquino[6',5',4':10,5,6]anthra[2,1,9-def]isoquinoline-2,15-disulfonate (commonly known as Violet 20 or V20) and an ammonium compound such as ammonium chloride.

Figure 5:
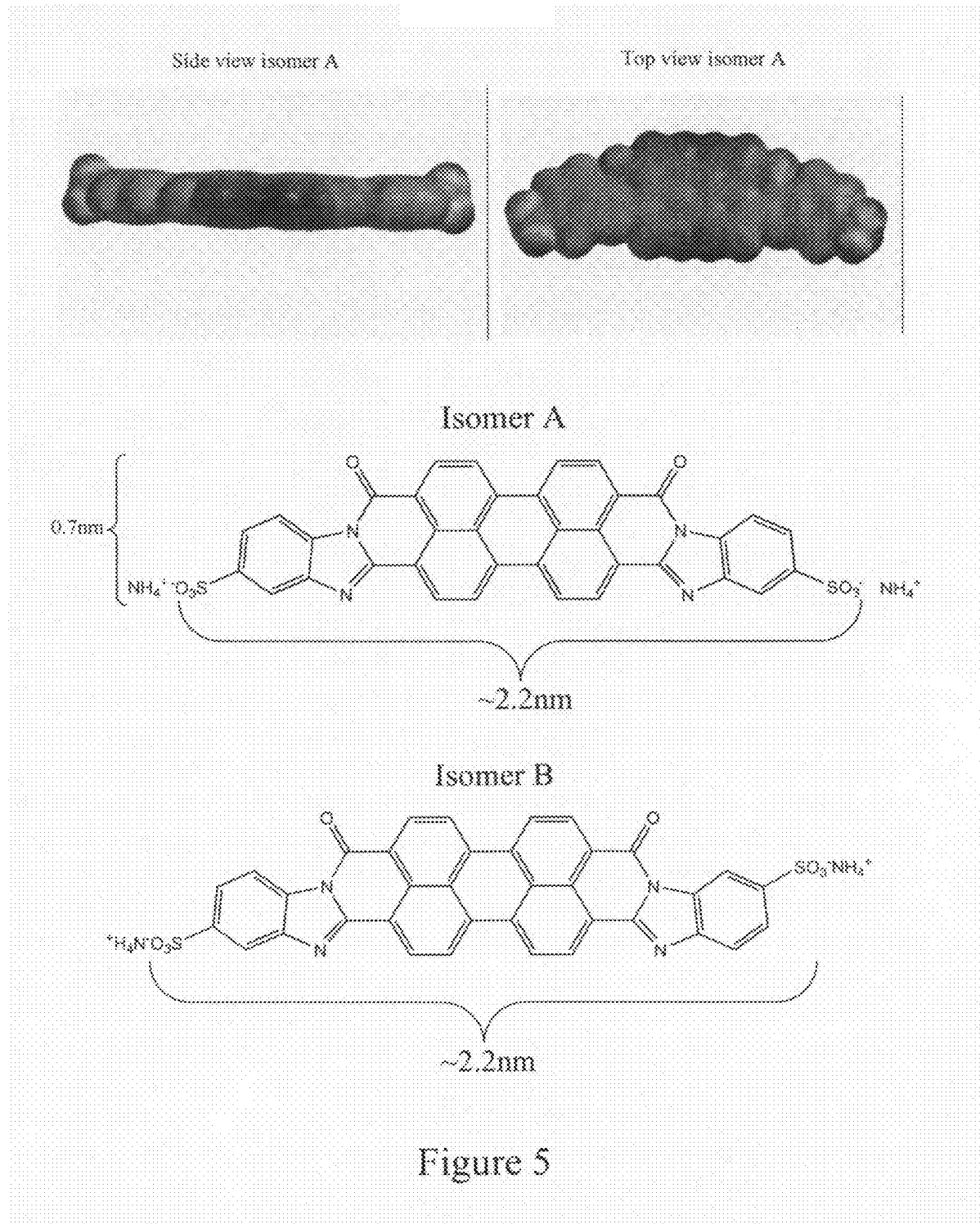
FIG. 5 shows the isomers, chemical formula and molecular model of Violet 20 used in the LCLC according to one embodiment of the present invention.

The isomers, chemical formula and molecular model of Violet 20 are illustrated in FIG. 5. Isomers of Violet 20 and molecular models show the flat polyaromatic core, the equilibrium geometry and charge distribution. In aqueous solutions, the ammonium cation dissociates leaving the molecule negatively charged. Violet 20 ($C_{36}H_{22}N_6O_8S_2$) is available from Optiva, Inc. [Detailed information can be found at URL: http://www.optivainc.com/.] It has a typical chromogenic structure: a rigid planar poly-aromatic core with ammonium counter ions at the periphery [Lydon, J., *Chromonics, in: Handbook of Liquid Crystals*; Wiley-VCH: Weinheim, 1998; vol. 2B, p 981; and *Current Opin. Coll. Int. Sci.*, 1998, 3, 458.]

The ammonium groups dissociate in aqueous solutions, leaving the molecule negatively charged by the remaining sulfate groups. In bulk solutions, the planar cores of the molecules attract each other thus avoiding contact with water. The resulting aggregates are believed to be of columnar type as the planes of the molecules form stacks (rather than closed micelles common in amphiphile systems) [Lydon, J., *Chromonics, in: Handbook of Liquid Crystals*; Wiley-VCH: Weinheim, 1998; vol. 2B, p 981; and *Current Opin. Coll. Int. Sci.*, 1998, 3, 458]. At sufficiently high concentrations, the columns form liquid crystalline mesophases: the long axes of columns are on average aligned along one direction, called the director, n.

In exemplary embodiments, the homeotropic bulk alignment of LCLCs in cell 100 is independent of substrates 42a and 42b in the presence of an ammonium compound, such as in a mixture of NH$_4$Cl, V20 and water with the mass ratio 0.8:7:100. For example, substrates 42a and 42b may be clean glass without any surface treatment. Substrates 42a and 42b may be glass treated with a basic reagent such as water solution of potassium hydroxide. They can be glass deposited with a layer of SiO. They can also be glass coated with a polymer such as a mixture of modified polyimides such as SE-7511, PI-2555, LARC CP1, and any combination thereof.

To make a cell of LCLC comprised of water solutions of V20 and NH$_4$Cl bulk-oriented, glass substrates may be washed in an ultra sonic bath of Alconox detergent and water for 10 minutes at 60° C. The substrates may then be removed and dried. The glass substrates can then be placed in a vacuum chamber. SiO is evaporated and deposited onto the surface of the glass substrates. The substrates are placed such that the influx of SiO is at a 5° angle as measured from the surface of the glass. The distance between the glass and the evaporation source is about 40". The thickness of the SiO alignment layer can be for example 150 nm.

LARC CP1 represents poly(5-[1-(1,3-dioxo-2,3-dihydro-1H-isoindol-5-yl)-2,2,2-trifluoro-1 (trifluoromethyl)ethyl]-2-(4-{4-[2,2,2-trifluoro-1-(3-phenoxyphenyl)-1-(trifluoromethyl)ethyl]phenoxy}phenyl)-1H-isoindole-1,3(2H)-dione), as shown in the following chemical structure:

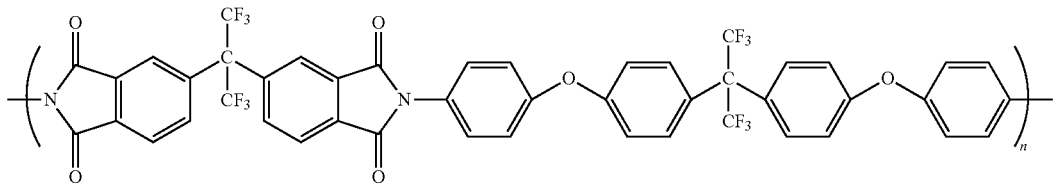

A mixture of modified polyimides such as the solution of polymer SE-7511 in Nissan 26 solution may be commercially obtained from Nissan Chemical, Japan.

The polymer PI-2555 is represented by formula (I):

Formula (I)

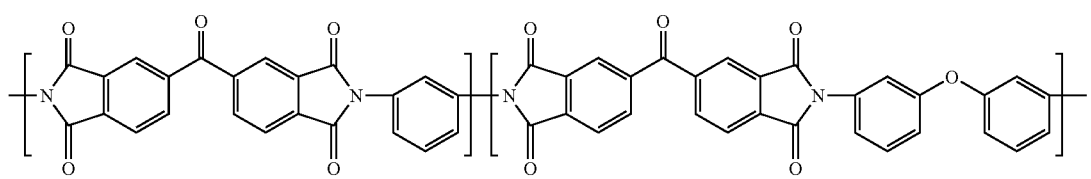

PI-2555 is the imidization product of three components: a dianhydride such as BTDA (3,3',4,4Benzophenonetetracarboxylic acid dianhydride), ODA (4,4-Oxydianiline) and a diamine such as MPD (1,3-phenylenediamine).

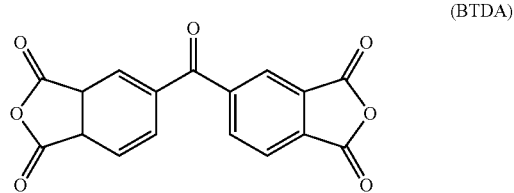

(BTDA)

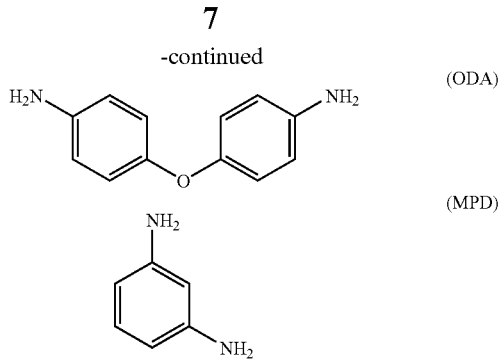

The present invention also provides a pair of opposed substrates with alignment layers imparted with orientations such that the LCLC molecular stack is pointed perpendicular to the substrates. In exemplary embodiments, the method for homeotropic bulk alignment of LCLCs is based on a treatment of the substrates 42a and 42b with a polymer layer. In such embodiments, an ammonium compound is not necessary for LCLC to obtain a homeotropic bulk alignment. Examples of lyotropic liquid crystal material between substrates 42a and 42b include, but are not limited to, V20, 1-ethyl-2-[(1-ethyl-2(1H)-quinolylidene)methyl]quinolinium chloride (PIC), and any combination thereof. Examples of the polymer layer coated on substrates 42a and 42b include, but are not limited to, LARC CP1 from chloroform solution, a mixture of modified polyimides such as SE-7511 from Nissan 26 solution, and any combination thereof.

In one example, cell 100 comprises V20 as the lyotropic liquid crystal material, and substrates 42a and 42b coated with LARC CP1 from chloroform solution or a mixture of modified polyimides such as SE-7511 from Nissan 26 solution.

In another example, cell 100 comprises 1-ethyl-2-[(1-ethyl-2(1H)-quinolylidene)methyl]quinolinium chloride (PIC) as the lyotropic liquid crystal material, and substrates 42a and 42b coated with a mixture of modified polyimides such as SE-7511 from Nissan 26 solution.

PIC (as shown below) is also known as Pseudoisocyanine chloride; CA Index Name Quinolinium, 1-ethyl-2-[(1-ethyl-2(1H)-quinolinylidene)methyl]-, chloride (9Cl); and other names such as 1-Ethyl-2-[(1-ethyl-2(1H)-quinolylidene)methyl]quinolinium chloride (6Cl,7Cl); Quinolinium, 1-ethyl-2-[(1-ethyl-2(1H)-quinolylidene)methyl]-, chloride (8Cl); 1,1'-Diethyl-2,2'-quinocyanine chloride (8Cl); Cyanine IV (8Cl); Pseudocyanine chloride (8Cl); 1,1'-Diethyl-2,2'-cyanine chloride; 2,2'-Cyanine chloride; 2,2'-Cyanine chloride, 1,1'-diethyl-; 2,2'-Quinocyanine chloride; Diethylcyanine; N,N'-Diethylpseudoisocyanine; N,N'-Diethylpseudoisocyanine chloride; and Pseudoisocyanine diethyl chloride.

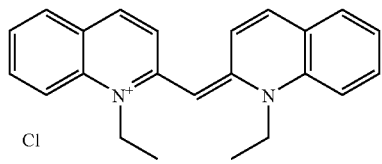 [SMILES: CCN1/C(=C/c2ccc3ccccc3[n+]2CC)C=Cc2ccccc21 ; Cl]

The invention can align LCLC's in the bulk as a uniform monodomain of a liquid crystalline order. "Bulk alignment" allows one to obtain a homeotropic alignment of the LCLC material, such as with a water solution of Violet 20 or PIC. To align the LCLC in a homeotropic fashion a polymer alignment layer is disposed on the substrate. The alignment material can be a polymer that yields a completely planar (the angle at which director is pointed at the surface is zero) alignment of standard thermotropic liquid crystals. When the planar polymer surface is prepared, the nematic phase of the Violet 20 or PIC LCLC aligns in the direction that is normal to the substrate. This fact demonstrates that one is able to align LCLCs with surface treatments that exhibit zero pretilt angles for thermotropic liquid crystals. Other alignment techniques are also believed to be viable with LCLC material. For example, angular deposition of SiO could be used as an alignment layer. Or, irradiation of a photosensitive polymer with polarized light could be used. Of course, only photosensitive polymers can be used in this technique which may adversely alter the properties of the liquid crystal for its intended use in this application.

Figure 6:
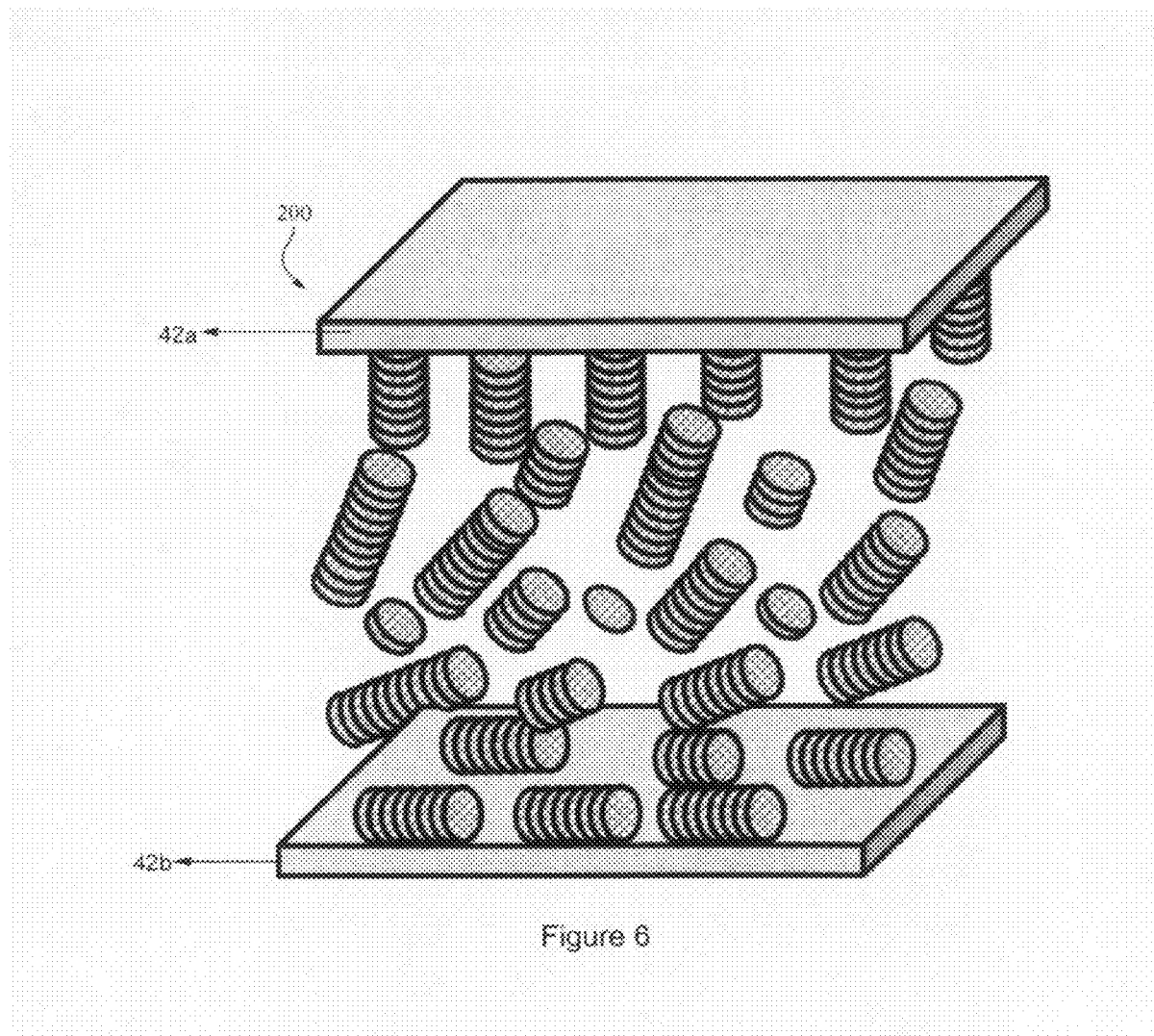
FIG. 6 is a schematic cross-sectional view of a lyotropic chromonic liquid crystal cell with hybrid alignment according to one embodiment of the present invention.

Various embodiments of the present invention provide a liquid crystal cell 200 as shown in FIG. 6. With reference to FIG. 6, cell 200 comprises (i) a first substrate 42a; (ii) a second substrate 42b opposed to first substrate 42a; and (iii) a surfactant-free lyotropic liquid crystal material disposed between first substrate 42a and second substrate 42b and aligned. FIG. 6 is similar to FIGS. 2 and 3 except that director 60 or the long axes of the aggregates are oriented in a direction perpendicular to substrate 42a in the vicinity of first substrate 42a and oriented in a direction parallel to substrate 42b in the vicinity of second substrate 42b. In FIG. 6, the alignment of the lyotropic liquid crystal material is a stable hybrid alignment. The alignment is a homeotropic alignment in the vicinity of first substrate 42a, and the alignment is a planar alignment in the vicinity of second substrate 42b. The cell comprises a bulk solution in which the lyotropic liquid crystals are aligned in a hybrid fashion as a uniform liquid crystalline cell. LCLCs can be aligned in bulk as a uniform liquid crystalline monodomain within a closed cell.

The first substrate 42a may comprise suitable material such as glass. Similarly, the second substrate 42b may comprise suitable material such as glass. Typically, the lyotropic liquid crystal material in FIG. 6 is chromonic.

In exemplary embodiments, the combination of the substrates for cell 200 is such that one of them produces homeotropic alignment while another one gives planar alignment, which allows one to fabricate a so-called hybrid LCLC cell.

In an example, cell 200 comprises Violet 20 as the lyotropic liquid crystal material; substrate 42a coated with LARC CP1 from chloroform solution; and substrate 42b coated with a mechanically buffed polymer such as a mixture of modified polyimides such as SE-7511 from Nissan 26 solution.

Assembling a cell of two substrates produces different alignments, one substrate produces homeotropic orientation of LCLC and another orients LCLC planarly. As such, one can obtain a hybrid cell in which director orientation smoothly changes from homeotropic at one substrate to tilted in the bulk and finally to planar at the opposite substrate. In the hybrid LCLC cell the angle of the director orientation with respect to the substrate plane changes smoothly from 90° at the homeotropic substrate to 0° at the planar one.

The present invention further provides a method of making the liquid crystal cell as described above. The method comprises the steps (i) providing a first substrate; (ii) providing a second substrate opposed to said first substrate; (iii) disposing a surfactant-free lyotropic liquid crystal material between said first substrate and said second substrate; and (iv) aligning said lyotropic liquid crystal material so that the alignment of said lyotropic liquid crystal material is a homeotropic alignment at least in the vicinity of said first substrate.

In some embodiments of the method, the alignment of lyotropic liquid crystal material is a homeotropic bulk alignment, in which the alignment is a homeotropic alignment in the vicinity of said first substrate, and the alignment is a homeotropic alignment in the vicinity of said second substrate.

In some other embodiments of the method, the alignment of lyotropic liquid crystal material is a hybrid alignment, in which the alignment is a homeotropic alignment in the vicinity of said first substrate; while the alignment is a planar alignment in the vicinity of said second substrate.

The invention may be widely used in, for example, biosensing, detection and amplification of ligands, fabrications of optical elements such as optical retarders including compensators or highly effective optical compensating films or layers, and photovoltaics, among others.

When the liquid crystal is viewed between two crossed polarizers, the appearing texture and the intensity of transmitted light are determined by orientation of the optical axis (director) with respect to the polarizers and the direction of the propagating light beam. The homeotropic alignment corresponds to the director aligned perpendicular to the plane containing the polarization direction of the polarizer or the analyzer and therefore at normal light incidence (with respect to the substrates surfaces) when the polarizer and analyzer are crossed (their polarization directions are at 90° with respect to each other) the sample is dark. However, if the director field is disturbed and varies from point to point within the liquid crystal slab, then the resulting intensity of light passing through the polarizer, liquid crystal slab and analyzer will vary from point to point.

To illustrate the importance of a uniform director alignment of the liquid crystal material, consider an exemplary non-surfactant lyotropic liquid crystal cell used for the detection and amplification of ligands in U.S. Pat. No. 6,570,632. In any event, a lyotropic chromonic liquid crystal material is oriented in such a way that the director is everywhere perpendicular to the linear polarization of the incident light; there is no disruption of this alignment by foreign particles or biospecies such as receptors. The angle between the director and linear polarization is 90°, so that the intensity of any light transmitted through a polarizer, a cell, and a crossed analyzer, is zero. However, if there are interactions with the foreign particles such as ligands, and these interactions are sufficiently strong, they can distort the surrounding liquid crystalline matrix. In this case the system becomes locally transparent. This change is then detectable for generation of an appropriate signal. These are the important features allowing one to better use the lyotropic liquid crystals as a detection and amplification system.

The discussion above shows that an efficient detection of ligands is possible when the liquid crystal is aligned uniformly in the liquid crystal cell and when the ligand-receptor pairs disturb this uniform alignment. Therefore, achieving alignment of the liquid crystal significantly enhances the detection process. Uniform alignment may be used not only for detection and amplification of ligands, but also for other applications. For example, the LCLC molecules can absorb light with certain wavelength and polarization that may be used in many optical applications.

LCLC materials that do not adsorb visible light are used for creation of compensating films. For example, in LCD applications, the TN cell is viewed between two polarizers that are either parallel ('normally black', NB mode) or perpendicular ('normally white', NW mode) to each other. The NB TN cell is in the dark state when no field is applied, as the director undergoes a change between the two bounding plates. The dark state of the NW mode occurs when the applied field switches the twisted structure into a homeotropic state (with the director perpendicular to the plates). The leakage of light through the dark state of the device is more serious than the decrease of intensity of the light state. Consequently the compensators are designed for improving the off-state of NB displays and the on-state of NW displays. The poor viewing angle performance and image inversion of the TN LCD are caused by the positive birefringence of the liquid crystal layer. One can improve the optical performance of the NB TN display by compensating undesirable positive birefringence of the non-activated TN cell with a passive optical retarder. The compensating plate should have negative birefringence and an optical axis that mirrors the director configuration in the TN cell. The structure of a compensation film can be obtained by uniform alignment of chromonic lyotropic liquid crystals which have in-plane negative birefringence. To improve the dark state of a NW TN cell, the compensating film should have a different structure. In the field-on (dark) state a NW TN cell has a complex director configuration with splay deformations near the cell boundaries and vertical orientation in the middle of the cell. A corresponding optical retarder with a negative birefringence and splay optic axis configuration may be created using two substrates which produce different alignment: one substrate produces homeotropic orientation of LCLC and another orients LCLC planarly, therefore one obtains a hybrid cell in which director orientation smoothly changes from homeotropic at one substrate to tilted in the bulk and finally to planar at the opposite substrate. In the hybrid LCLC cell the angle of the director orientation with respect to the substrate plane changes smoothly from 90° at the homeotropic substrate to 0° at the planar one.

Uniform alignment of lyotropic liquid crystals depends on the nature of the material. The surfactant-based liquid crystals are usually self-aligned when placed between two parallel glass plates. The alignment in this case is homeotropic, which means that the director is oriented perpendicular to the bounding plates. The homeotropic alignment is explained by the surfactant nature of the molecules: the polar heads tend to attach to the bounding plates, which facilitates orientation of the whole surfactant bilayer parallel to the plates.

Although the surfactant-based liquid crystals are relatively easy to align, in some instances they cannot be used for detection of particular ligands. For example, the surfactant environment might harm the detected biological species. Most biologic receptors possess both hydrophilic and hydrophobic regions and thus can in principle incorporate into lyotropic liquid crystals. However, the quality of such incorporation depends on the particular hydrophobic-hydrophilic balance in the system. Using LCLC materials with hydrophobic-hydrophilic balance different from that of surfactant-based materials as a medium for amplification and detection can greatly enhance the detection and amplification technique described in U.S. Pat. No. 6,171,802. Aligned LCLC can also be used in other applications, for example, as polarizing elements. In this case the relevant LCLC molecules have absorbing properties. The direction of light polarization in LCLC polarizer is controlled by the alignment of the director. Aligned LCLCs can also be used as optical phase retarders; in this case, the LCC molecules do not have light absorbing properties; the aligned LCLC sample serves as optically birefringent slab with optical phase retardation controlled by the refractive indices of the material, alignment pattern, cell thickness, and coaction between these and other components of the cell. Homeotropically aligned dried LCLC thin films can be used in photovoltaic cells. The prototype application is for thermotropic columnar liquid crystals, built of aromatic discs assembled into columnar stacks, which have been shown to exhibit efficient charge and excitation transport properties along the columns.

The present invention advantageously has obtained uniform homeotropic and hybrid alignment of LCLCs, which is much more difficult to achieve as compared to surfactant-based lyotropic liquid crystals.

EXAMPLES

Example 1

Homeotropic Bulk Alignment of the V20 LCLC by the Polymer LARC CP1 Coated from the Chloroform Solution To make a cell of LCLC comprised water solution of V20 homeotropically bulk oriented, glass substrates were washed in an ultrasonic bath of Alconox detergent and water for 10 minutes at 60° C. The substrates were then removed and dried. The solution of LARC CP1 (developed by NASA [V. G. Nazarenko, A. K. St. Clair, R. Klouda, R. D. Polak, Yu. Nastishin and O. D. Lavrentovich, Journal of the SID, 135 (1998)]) in chloroform at a concentration of 0.5% was coated onto the glass substrates by a spincoater at 3000 rpm. The solvent was dried at 95° C. for 20 minutes. The cells then were made using the two substrates. The cell thickness was controlled by 15 μm spacers and fixed by epoxy glue applied along the spacer strips. The LCLC, comprised of a 7% water solution of V20, preheated to the isotropic phase, at temperature about 10° C. higher than the temperature of the phase transition to the isotropic phase (T≥40° C.), filled the cell by the pressure gradient from a vacuum pump connected to the cell through the rubber pipes. The pressure was slowly reduced and the pump was blocked when the cell was filled. The filled cell was then disconnected from the pump and sealed with epoxy glue. Normally if this cell but with rubbed substrates would be filled with the thermotropic liquid crystal 5CB, the pretilt would be 0°. This polymer coating proved to be suitable in aligning the V20 LCLC in a homeotropic fashion, which is appropriate for applications such as the detection and amplification of ligands and fabrications of optical elements such as optical retarders including compensators and the like.

Example 2

Absence of a Homeotropic Bulk Alignment of the V20 LCLC by the Polymer LARC CP1 Coated from the Dimethelcetylamid Solution To make a cell of LCLC comprised water solution of V20, glass substrates were washed in an ultrasonic bath of Alconox detergent and water for 10 minutes at 60° C. The substrates were then removed and dried. A 0.5% wt. solution of the chemically imidized polyimide LARC CP1 (developed by NASA) [25] in dimethylacetamide was spin-coated onto the glass at 3000 rpm. [V. G. Nazarenko, A. K. St. Clair, R. Klouda, R. D. Polak, Yu. Nastishin and O. D. Lavrentovich, Journal of the SID, 135 (1998)]). The cells then were made using the two substrates. The cell thickness was controlled by 15 μm spacers and fixed by epoxy glue applied along the spacer strips. The LCLC, comprised of a 7% water solution of V20, preheated to the isotropic phase, at temperature about 10° C. higher than the temperature of the phase transition to the isotropic phase (T≥40° C.), filled the cell by the pressure gradient from a vacuum pump connected to the cell through the rubber pipes. The pressure was slowly reduced and the pump was blocked when the cell was filled. The filled cell was then disconnected from the pump and sealed with epoxy glue. Normally if such a cell but with rubbed substrates would be filled with the thermotropic liquid crystal 5CB, the pretilt would be about 3°. This way of the polymer coating proved to be not suitable in aligning the V20 LCLC in a homeotropic fashion.

Example 3

Absence of a the Homeotropic Bulk Alignment of the Cromolyn LCLC by the Polymer LARC CP1 Coated from the Chloroform Solution To make a cell of LCLC comprised water solution of Cromolyn ($C_{23}H_{14}O_{11}Na_2$), glass substrates were washed in an ultrasonic bath of Alconox detergent and water for 10 minutes at 60° C. The substrates were then removed and dried. A 0.5% wt. solution of the chemically imidized polyimide LARC CP1 (developed by NASA) [V. G. Nazarenko, A. K. St. Clair, R. Klouda, R. D. Polak, Yu. Nastishin and O. D. Lavrentovich, Journal of the SID, 135 (1998)] in chloroform was spin-coated onto the glass at 3000 rpm. The cells were made using the two substrates. The cell thickness was controlled by 15 μm spacers and fixed by epoxy glue applied along the spacer strips. The LCLC, comprised of a 14% water solution of Cromolyn, preheated to the isotropic phase, at temperature about 10° C. higher than the temperature of the phase transition to the isotropic phase (T≥40° C.), filled the cell by the pressure gradient from a vacuum pump connected to the cell through the rubber pipes. The pressure was slowly reduced and the pump was blocked when the cell was filled. The filled cell was then disconnected from the pump and sealed with epoxy glue. If such a cell but with rubbed substrates would be filled with the thermotropic liquid crystal 5CB, the director orientation would be strictly planar with the pretilt angle of 0°. If this cell would be filled with the V20 LCLC the orientation would be homeotropic. The Cromolyn LCLC does not align in a homeotropic fashion by this polymer coated from chloroform.

Example 4

Absence of a Homeotropic Bulk Alignment of the Blue 27 LCLC by the Polymer LARC CP1 Coated from the Chloroform Solution To make a cell of LCLC comprised water solution of Blue 27 (4.5%, available from Optiva, Inc. [Detailed information can be found at URL: http://www.optivainc.com/.]), glass substrates were washed in an ultrasonic bath of Alconox detergent and water for 10 minutes at 60° C. The substrates were then removed and dried. A 0.5% wt. solution of the chemically imidized polyimide LARC CP1 (developed by NASA) [V. G. Nazarenko, A. K. St. Clair, R. Klouda, R. D. Polak, Yu. Nastishin and O. D. Lavrentovich, Journal of the SID, 135 (1998)] in chloroform was spin-coated onto the glass at 3000 rpm. The cells were made using the two substrates. The cell thickness was controlled by 15 μm spacers and fixed by epoxy glue applied along the spacer strips. The LCLC, comprised of a 4.5% water solution of Blue 27, preheated to the isotropic phase, at temperature about 10° C. higher than the temperature of the phase transition to the isotropic phase (T≥40° C.), filled the cell by the pressure gradient from a vacuum pump connected to the cell through the rubber pipes. The pressure was slowly reduced and the pump was blocked when the cell was filled. The filled cell was then disconnected from the pump and sealed with epoxy glue. If such a cell but with rubbed substrates would be filled with the thermotropic liquid crystal 5CB, the director orientation would be strictly planar with the pretilt angle of 0°. If this cell would be filled with the V20 LCLC the orientation would be homeotropic. The Blue 27 LCLC does not align in a homeotropic fashion by this polymer coated from chloroform

Example 5

Homeotropic Bulk Alignment of the PIC LCLC by the Polymer SE-7511

To make a cell of LCLC comprised water solution of PIC homeotropically bulk oriented, glass substrates were washed in an ultrasonic bath of Alconox detergent and water for 10 minutes at 60° C. The substrates were then removed and dried. The solution of polymer SE-7511 (Nissan Chemical, Japan) in Nissan 26 solution at a concentration of 3% was coated onto the glass substrates by a spincoater at 3000 rpm. The solvent was dried at 95° C. for 2 minutes prior to baking the substrates at 180° C. for one hour. The cells then were made using the two substrates. The cell thickness was controlled by 15 μm spacers and fixed by epoxy glue applied along the spacer strips. The LCLC, comprised of a 0.5% water solution of PIC, preheated to the isotropic phase, at temperature about 10° C. higher than the temperature of the phase transition to the isotropic phase ($T \geq 50°$ C.), filled the cell by the pressure gradient from a vacuum pump connected to the cell through the rubber pipes. The pressure was slowly reduced and the pump was blocked when the cell was filled. The filled cell was then disconnected from the pump and sealed with epoxy glue. Normally if such a cell but with rubbed substrates would be filled with the thermotropic liquid crystal 5CB, the pretilt would be 0°. This polymer coating proved to be suitable in aligning the PIC LCLC in a homeotropic fashion, which is appropriate for applications such as the detection and amplification of ligands and fabrications of optical elements such as optical retarders including compensators and the like.

Example 6

Absence of Homeotropic Bulk Alignment of the PIC LCLC by the Polymer LARC CP1 Coated from Chloroform Solution To make a cell of LCLC comprised water solution of PIC, glass substrates were washed in an ultrasonic bath of Alconox detergent and water for 10 minutes at 60° C. The substrates were then removed and dried. The solution of LARC CP1 (developed by NASA [V. G. Nazarenko, A. K. St. Clair, R. Klouda, R. D. Polak, Yu. Nastishin and O. D. Lavrentovich, Journal of the SID, 135 (1998)]) in chloroform at a concentration of 0.5% was coated onto the glass substrates by a spincoater at 3000 rpm. The solvent was dried at 95° C. for 20 minutes. The cells then were made using the two substrates. The cell thickness was controlled by 15 μm spacers and fixed by epoxy glue applied along the spacer strips. The LCLC, comprised of a 0.5% water solution of PIC, preheated to the isotropic phase, at temperature about 10° C. higher than the temperature of the phase transition to the isotropic phase ($T \geq 50°$ C.), filled the cell by the pressure gradient from a vacuum pump connected to the cell through the rubber pipes. The pressure was slowly reduced and the pump was blocked when the cell was filled. The filled cell was then disconnected from the pump and sealed with epoxy glue. Normally if such a cell but with rubbed substrates would be filled with the thermotropic liquid crystal 5CB, the pretilt would be 0°. This PIC LCLC does not align in a homeotropic fashion by this polymer coated from chloroform.

Example 7

Homeotropic Bulk Alignment of the V20 LCLC by the Polymer SE-7511

To make a cell of LCLC comprised water solution of V20 homeotropically bulk oriented, glass substrates were washed in an ultrasonic bath of Alconox detergent and water for 10 minutes at 60° C. The substrates were then removed and dried. The solution of polymer SE-7511 (Nissan Chemical, Japan) in Nissan 26 solution at a concentration of 3% was coated onto the glass substrates by a spincoater at 3500 rpm. The solvent was dried at 95° C. for 2 minutes prior to baking the substrates at 180° C. for one hour. The cells then were made using the two substrates. The cell thickness was controlled by 15 μm spacers and fixed by epoxy glue applied along the spacer strips. The LCLC, comprised of a 7% water solution of V20, preheated to the isotropic phase, at temperature about 10° C. higher than the temperature of the phase transition to the isotropic phase ($T \geq 40°$ C.), filled the cell by the pressure gradient from a vacuum pump connected to the cell through the rubber pipes. The pressure was slowly reduced and the pump was blocked when the cell was filled. The filled cell was then disconnected from the pump and sealed with epoxy glue. Normally if this cell but with rubbed substrates would be filled with the thermotropic liquid crystal 5CB, the pretilt would be 0°. This polymer coating proved to be suitable in aligning the V20 LCLC in a homeotropic fashion, which is appropriate for applications such as the detection and amplification of ligands and fabrications of optical elements such as optical retarders including compensators and the like.

Example 8

Hybrid Bulk Alignment of the V20 LCLC in the Cell Assembled of Two Substrates One of Which was Coated by the Polymer LARC CP1 Applied from the Chloroform Solution and Another One was Coated by the Mechanically Buffed Polymer SE-7511

To make a cell of LCLC comprised water solution of V20 bulk oriented in a hybrid fashion, glass substrates were washed in an ultrasonic bath of Alconox detergent and water for 10 minutes at 60° C. The substrates were then removed and dried. The solution of LARC CP1 (developed by NASA [V. G. Nazarenko, A. K. St. Clair, R. Klouda, R. D. Polak, Yu. Nastishin and O. D. Lavrentovich, Journal of the SID, 135 (1998)]) in chloroform at a concentration of 0.5% was coated onto set of the glass substrates by a spincoater at 3000 rpm. The solution of polymer SE-7511 (Nissan Chemical, Japan) in Nissan 26 solution at a concentration of 3% was coated onto another set of the glass substrates by a spincoater at 1500 rpm. The solvent was dried at 180° C. for 2 minutes prior to baking the substrates at 180° C. for one hour. An aluminum block covered with felt rubs unidirectionally 3 times the substrates covered by the polymer SE-7511. The rubbing conditions were as follows: the dimensions of the block were 3×7.5×0.75 inches. The pile length of felt was ⅛ inch, the pressure was 0.12 lb/in², and the speed 10 in/sec. The cells then were made using the two substrates with two different polymer coatings, one of which was coated by the LARC CP1 polymer and another one was coated by the polymer SE-7511. The cell thickness was controlled by 15 µm spacers and fixed by epoxy glue applied along the spacer strips. The LCLC, comprised of a 7% water solution of V20, preheated to the isotropic phase, at temperature about 10° C. higher than the temperature of the phase transition to the isotropic phase (T≥40° C.), filled the cell along the rubbing direction by the pressure gradient from a vacuum pump connected to the cell through the rubber pipes. The pressure was slowly reduced and the pump was blocked when the cell was filled. The filled cell was then disconnected from the pump and sealed with epoxy glue. These polymer coatings proved to be suitable in aligning the V20 LCLC in a hybrid fashion, which is appropriate for applications such as the detection and amplification of ligands and fabrications of optical elements such as optical retarders including compensators and the like.

Example 9

Substrate Independent Homeotropic Bulk Alignment of the V20 LCLC by Adding $NH_4Cl$ To make a cell of LCLC comprised water solution of V20 homeotropically bulk oriented, $NH_4Cl$ was added. The LCLC was comprised of $NH_4Cl$, V20 and water with the mass ratio 0.8:7:100. Glass substrates were washed in an ultrasonic bath of Alconox detergent and water for 10 minutes at 60° C. The substrates were then removed and dried. Different treatment were used to prepare the substrate after the cleaning:
1. No surface treatment, clean glass only.
2. The solution of polymer SE-7511 (Nissan Chemical, Japan) in Nissan 26 solution at a concentration of 50% was coated onto the glass substrates by a spincoater at 3500 rpm. The solvent was dried at 95° C. for 2 minutes prior to baking the substrates at 180° C. for one hour.
3. The solution of polymer PI-2555 (Nissan Chemical, Japan) in Nissan 26 solution at a concentration of 20% was coated onto the glass substrates by a spincoater at 3500 rpm. The solvent was dried at 95° C. for 2 minutes prior to baking the substrates at 275° C. for one hour.
4. The solution of LARC CP1 (developed by NASA [V. G. Nazarenko, A. K. St. Clair, R. Klouda, R. D. Polak, Yu. Nastishin and O. D. Lavrentovich, Journal of the SID, 135 (1998)]) in Nissan 26 solution at a concentration of 0.5% was coated onto the glass substrates by a spincoater at 3000 rpm. The solvent was dried at 95° C. for 20 minutes.
5. Glass substrates were washed in an ultrasonic bath of potassium hydroxide (Aldrich) water solution and for one hour. The mass ratio of potassium hydroxide and water was 1:5. On the top of the solution, 2-proponal was used to cover the solution to avoid the contact of potassium hydroxide and $CO_2$. Clean the substrate with non-ionic water for 30 s after the substrate was taken out from the potassium hydroxide water solution.
6. SiO was evaporated to glass substrate, where the SiO thickness was 50 nm.

Figure 7:
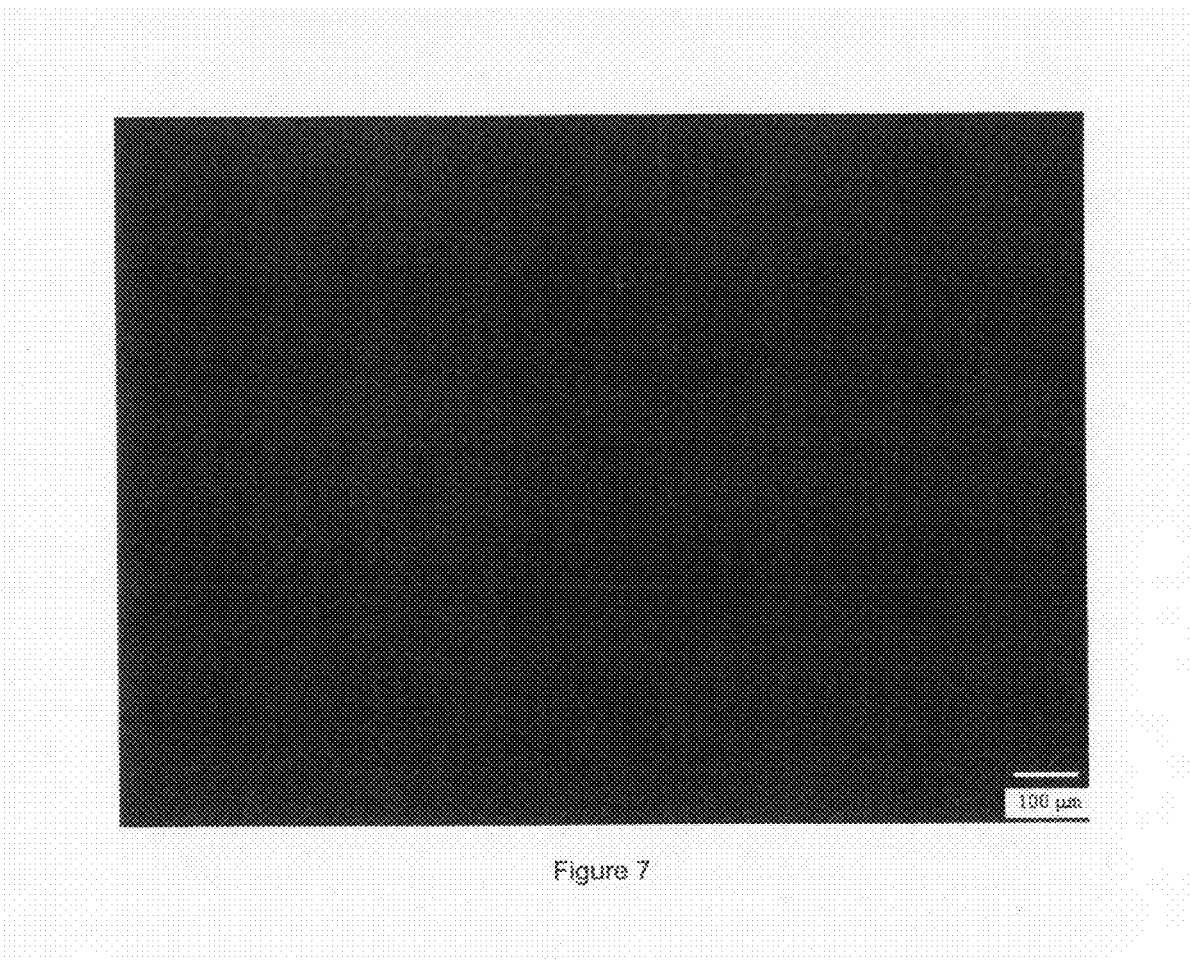
FIG. 7 shows the microscope texture of a LCLC cell with clean glass substrates and a water solution of $NH_4Cl$ and V20 according to one embodiment of the present invention.

Different cell thickness (from 10 µm to 75 µm) was controlled spacers and fixed by epoxy glue applied along the spacer strips. Substrates 1 to 6 with different cell thickness (from 10 µm to 75 µm) were used to assemble the cells. The LCLC, preheated to the isotropic phase, at temperature about 10° C. higher than the temperature of the phase transition to the isotropic phase (T≥40° C.), filled the cell by the pressure gradient from a vacuum pump connected to the cell through the rubber pipes. The pressure was slowly reduced and the pump was blocked when the cell was filled. The filled cell was then disconnected from the pump and sealed with epoxy glue. It is proved the V20 LCLC was aligned in a homeotropic fashion independent of the substrates, which is appropriate for applications such as the detection and amplification of ligands and fabrications of optical elements such as optical retarders including compensators and the like. FIG. 7 shows the microscope texture of a LCLC cell of 15 µm thickness, in which the substrates were clean glass with no alignment layer, and LCLC was composed of $NH_4Cl$, V20 and water with the mass ratio 0.8:7:100. V20 in water solution.

Comparative Example 9

Figure 8:
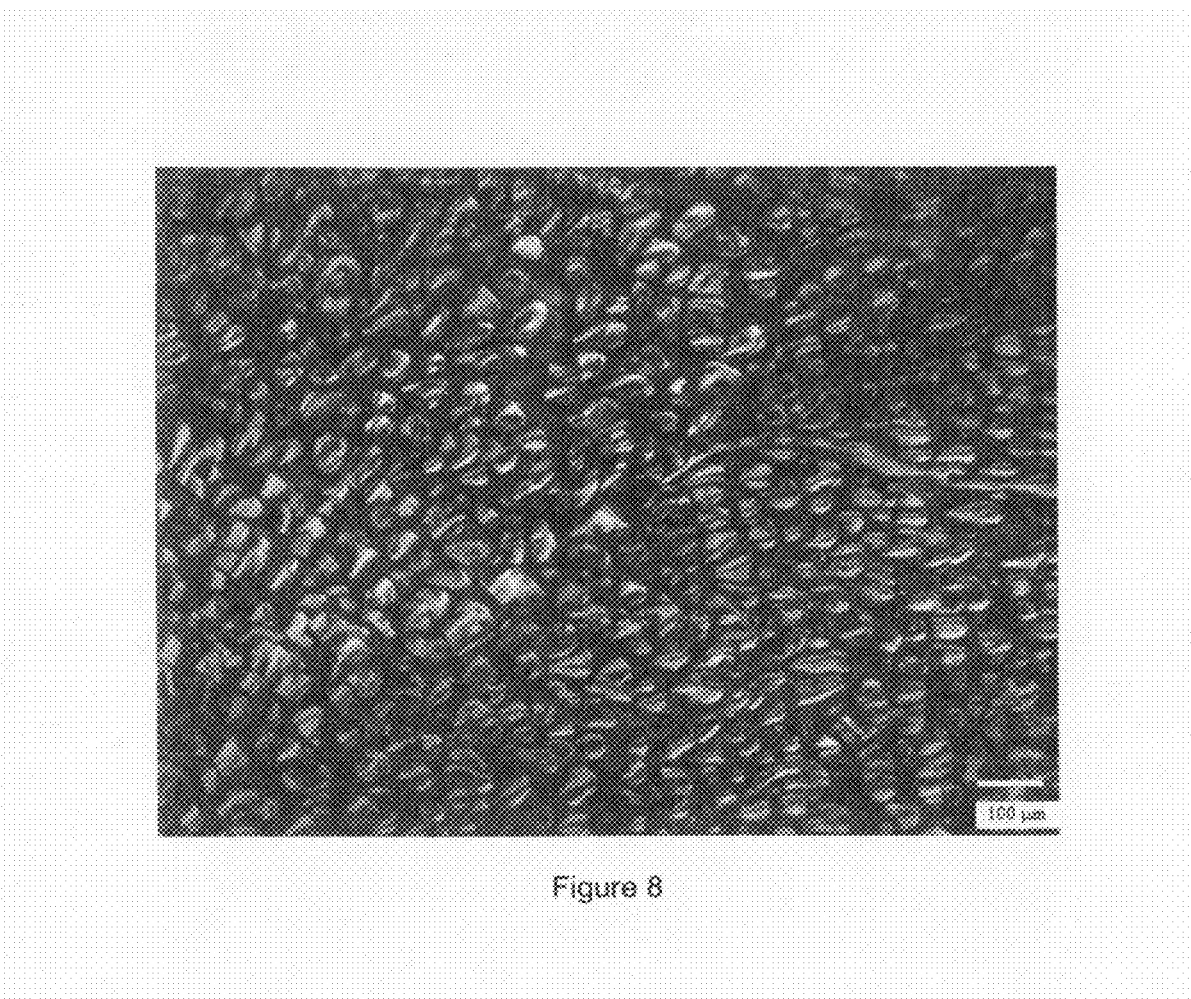
FIG. 8 shows the microscope texture of a LCLC cell with clean glass substrates and a water solution of V20 only.

Absence of Homeotropic Bulk Alignment of the V20 LCLC Without $NH_4Cl$ by Glass Substrates A cell was made similar to Example 9 except that the substrates were clean glass with no alignment layer; and LCLC was composed of 7% of V20 in water solution. The cell thickness was 15 µm. FIG. 8 shows the microscope texture of the LCLC cell made according to this example.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A liquid crystal cell, comprising (i) a first substrate; (ii) a second substrate opposed to said first substrate; and (iii) an aligned aqueous surfactant-free lyotropic chromonic liquid crystal material disposed between said first substrate and said second substrate; wherein the alignment of said lyotropic chromonic liquid crystal material is a stable hybrid alignment having homeotropic alignment in an area proximate said first substrate and planar alignment in an area proximate said second substrate.

2. The cell according to claim 1, wherein the alignment of said lyotropic liquid crystal material is a bulk alignment.

3. The cell according to claim 2, wherein the first substrate comprises glass, the second substrate comprises glass.

4. The cell according to claim 3, wherein the lyotropic liquid crystal material further comprises an ammonium compound.

5. The cell according to claim 4, wherein the lyotropic liquid crystal material comprises diammonium 6,11-dioxo-6,11,17,17a,21b,22-hexahydrobenzimidazo[2,1a]benzimidazo[1",2":2',3']isoquino[6',5',4':10,5,6]anthra[2,1,9-def]isoquinoline-2,15-disulfonate (Violet 20).

6. The cell according to claim 4, wherein the ammonium compound comprises ammonium chloride.

7. The cell according to claim 5, wherein the glass includes a layer of SiO.

8. The cell according to claim 5, wherein the glass is coated with a mixture of modified polyimides, the polymer represented by formula (I), poly(5-[1-(1,3-dioxo-2,3-dihydro-1H-isoindol-5-yl)-2,2,2-trifluoro-1 (trifluoromethyl)ethyl]-2-(4-{4-[2,2,2-trifluoro-1-(3-phenoxyphenyl)-1-(trifluoromethyl)ethyl]phenoxy}phenyl)-1H-isoindole-1,3 (2H)-dione), and mixture thereof

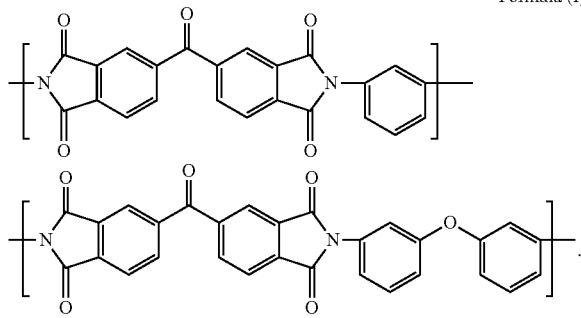

Formula (I)

9. The cell according to claim 3, wherein said lyotropic liquid crystal material comprises diammonium 6,11-dioxo-6,11,17,17a,21b,22-hexahydrobenzimidazo[2,1a]benzimidazo[1",2":2',3']isoquino[6',5',4':10,5,6]anthra[2,1,9-def]isoquinoline-2,15-disulfonate (Violet 20).

10. The cell according to claim 9, wherein said first and second substrates includes a coating comprised of a polymer such as poly(5-[1-(1,3-dioxo-2,3-dihydro-1H-isoindol-5-yl)-2,2,2-trifluoro-1 (trifluoromethyl)ethyl]-2-(4-{4-[2,2,2-trifluoro-1-(3-phenoxyphenyl)-1-(trifluoromethyl)ethyl]phenoxy}phenyl)-1H-isoindole-1,3(2H)-dione) from chloroform solution, and a mixture of modified polyimides.

11. The cell according to claim 3, wherein said lyotropic liquid crystal material comprises 1-ethyl-2-[(1-ethyl-2(1H)-quinolylidene)methyl]quinolinium chloride (PIC).

12. The cell according to claim 11, wherein said first and second substrates are coated with a mixture of modified polyimides.

13. A method of making the liquid crystal cell in claim 1 comprising (i) providing a first substrate; (ii) providing a second substrate opposed to said first substrate; (iii) disposing a surfactant-free lyotropic liquid crystal material between said first substrate and said second substrate; and (iv) aligning said lyotropic liquid crystal material so that the alignment of said lyotropic liquid crystal material is a homeotropic alignment at least in the vicinity of said first substrate.

14. The method according to claim 13, wherein aligning said lyotropic liquid crystal material so that the alignment of said lyotropic liquid crystal material is a bulk alignment; the alignment is a homeotropic alignment in the vicinity of said first substrate, and the alignment is a homeotropic alignment in the vicinity of said second substrate.

15. The method according to claim 13, wherein aligning said lyotropic liquid crystal material so that the alignment of said lyotropic liquid crystal material is a hybrid alignment; the alignment is a homeotropic alignment in the vicinity of said first substrate; and the alignment is a planar alignment in the vicinity of said second substrate.

16. The use of the liquid crystal cell according to claim 1, wherein the cell is an element of at least one of: a biosensor, a detection and amplification device for ligands; an optical element in an optical retarder; an optical element in an optical compensating films; and a photovoltaic device.

* * * * *